US011330526B2

(12) United States Patent
Anand

(10) Patent No.: US 11,330,526 B2
(45) Date of Patent: May 10, 2022

(54) SYSTEM AND METHOD FOR OPTIMIZING POWER CONSUMPTION IN VIDEO COMMUNICATIONS IN MOBILE DEVICES

(71) Applicant: TriSpace Technologies (OPC) Pvt. Ltd., Bengaluru (IN)

(72) Inventor: Narasimhan Vijay Anand, Bengaluru (IN)

(73) Assignee: TriSpace Technologies (OPC) Pvt. Ltd., Bangalore (IN)

( * ) Notice: Subject to any disclaimer, the term of this patent is extended or adjusted under 35 U.S.C. 154(b) by 0 days.

(21) Appl. No.: 17/128,727

(22) Filed: Dec. 21, 2020

(65) Prior Publication Data

US 2021/0377868 A1 Dec. 2, 2021

(30) Foreign Application Priority Data

May 29, 2020 (IN) .............................. 202041022525

(51) Int. Cl.
*H04W 52/02* (2009.01)
*H04N 5/44* (2011.01)
*H04N 19/86* (2014.01)
*H04N 7/14* (2006.01)

(52) U.S. Cl.
CPC .......... *H04W 52/0261* (2013.01); *H04N 5/44* (2013.01); *H04N 7/147* (2013.01); *H04N 19/86* (2014.11)

(58) Field of Classification Search
CPC ......... H04W 52/02; H04N 7/14; H04N 19/86; H04N 52/02

USPC ............................................ 348/14.01–14.16
See application file for complete search history.

(56) References Cited

U.S. PATENT DOCUMENTS

| 10,390,309 | B1* | 8/2019 | Anand | ................ G10L 19/00 |
| 2015/0243563 | A1* | 8/2015 | Lee | ................ H01L 27/0922 |
| | | | | 257/392 |
| 2018/0324464 | A1* | 11/2018 | Zhang | .............. H04N 19/91 |

OTHER PUBLICATIONS

CN 101820542 A [Wang et al.]; Sep. 1, 2010; Video Transmission Method for Effective Control of Unequal Power Consumption.*

(Continued)

*Primary Examiner* — Melur Ramakrishnaiah
(74) *Attorney, Agent, or Firm* — J. Peter Paredes; Amin Talati Wasserman LLP

(57) ABSTRACT

The present invention provides a system and method for optimizing power consumption in video communication in mobile devices. The system comprises a video codec encoder module, a video codec decoder module and post-processing filtering module (Deblocking filter) modules. The post-processing modules are implemented on a DSP/VLIW processor, while the video encoder and decoder modules are implemented on a CPU with SIMD extensions. This pipelined implementation of modules in multi-core reduces current consumption in the SoC by up to 50 percent compared to an implementation of the modules in a single/multiple DSP/VLIW core. The significant reduction in current consumption of the modules enables reduction of power consumption in the video call time. Thus, the invention provides a simple method of optimizing power consumption by multi core implementation of the modules in a video call in mobile devices.

9 Claims, 5 Drawing Sheets

(56) References Cited

OTHER PUBLICATIONS

WO 2019010156 A1; Ye Yan et al; Motion-Compensation Prediction Basedon Bi-Directional Optical Flo.*
CN 105516635 A [Che et al.]; Video Communication System, Device and Method.*
JP 2008521097 A; Video Processing.*

* cited by examiner

SYSTEM AND METHOD FOR OPTIMIZING POWER CONSUMPTION IN VIDEO COMMUNICATIONS IN MOBILE DEVICES

CROSS-REFERENCE TO RELATED APPLICATIONS

The present application claims priority to Indian Application Serial No. 202041022525, filed May 29, 2020, herein incorporated by reference in its entirety.

PREAMBLE TO THE DESCRIPTION

The following specification particularly describes the invention and the manner in which it is to be performed:

DESCRIPTION OF THE INVENTION

Technical Field of the Invention

The present invention relates to a system and method for optimizing power consumption in mobile devices. More specifically, the present invention relates to optimizing power consumption in mobile devices by reducing current consumption in a video communication by implementing video codecs on a Central Processing Unit (CPU) with Single Instruction Multiple Data (SIMD) extensions and post processing modules including filters (deblocking filtering which are part of the codec) on a Digital Signal Processor (DSP) core.

Background of the Invention

Video communication is fast becoming possible with adoption of 5G technology which offers at the core high data rates which is typical of video communication. There are various small form factor devices which would be designed to embrace 5G technology such as mobiles, smartphone and other portable wireless devices.

Video communication involves encoding(compressing) and decoding(decompressing) of digital video data. There are various video compression standards such as MPEG-1, MPEG-2, MPEG-4, H.264, H.265, AV1, VP8, VP10 and many more upcoming standards. These video codecs encode video signals by exploiting spatial redundancy (Intra prediction), temporal redundancy (Motion compensation), statistical redundancy of encoded symbols (Variable Length Coding (VLC), Context Adaptive VLC (CAVLC), Context Adaptive Binary Arithmetic Coding (CABAC)). The computational complexity of processing these modules takes lot of processing cycles, and hence consume lot of current while the video encoder/decoder is running during video communication in the battery driven gadget/device such as smartphone mobile.

The high loading of processor in video communication causes lot of power consumption, as a result the battery life of device usage is drastically reduced in video communication.

Minimizing power consumption and/or improving the data rate and user experience in User Equipment (UE) devices is important for all wireless communications systems. UE devices are increasingly consuming higher amounts of power as they become more and more sophisticated. UE devices have an onboard battery with a limited capacity. Thus, there is a problem of getting the best possible user experience under the constraint of a limited battery.

The U.S. patent document U.S. Pat. No. 10,390,309 titled "System and method for optimizing power consumption in mobile devices" discloses a method and apparatus for optimizing power consumption in mobile devices by suitable Instruction Set Architectural feature changes and optimal implementation of speech codecs. However, the solution is aimed at primary targeting the voice call use case.

Hence, there exists a need for system and method to optimize power consumption in mobile devices for optimizing power consumption in video communication.

SUMMARY OF THE INVENTION

The present invention overcomes the drawbacks in the prior art and provides a system and method for optimizing power consumption in communication in mobile devices.

The system comprises a camera integrated with the mobile device. The camera sensor captures input video and converts into digital video with typical pixel size of 8 bits. Nowadays higher resolution camera sensor is available which can capture pixel size of 10 bits.

In an embodiment of the invention, digital video signal is encoded according to compression standards H.264 or any other suitable standard for application. The various encoding tools such as Intra prediction, Motion Compensation, Variable Length coding are implemented in a CPU with instruction set having SIMD extension but without critical single cycle instruction Multiply and Accumulate (MAC). The post processing modules including codec module deblocking filter is implemented on a DSP. The current consumption in the System-On-Chip (SoC) is lowered by implementing the deblocking filters and post-processing modules on a DSP/VLIW core in the SoC while the video encoder is implemented in CPU with SIMD extensions. The encoded signal is then transmitted over network.

The system also includes video codec decoder module disposed at the receiving end. The video codec decoder module is configured to decompress/decode the received compressed video signal from the network. The decoded video signal is then post processed using deblocking filter module. The post processing modules are implemented in a DSP/VLIW core while the video codec decoder is implemented in CPU with SIMD extensions.

Thus, the present invention also provides method to improve the power consumption in a video call in mobile devices. The present method yields up to 50 percent savings in current consumption in a video call compared to an implementation of video codecs and post processing modules on digital signal processor (DSP)/very long instruction word (VLIW) processor.

The video talk time is increased by less power consumption, thereby reduction of thermal aspect and extension of battery life.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The term "talk time" refers to the time during which a mobile telephone/mobile device is in use to handle video calls, especially as a measure of the duration of the telephone's/mobile's battery.

The present invention provides a system and method for optimizing power consumption in video communication in mobile devices. The system comprises a camera, a video codec encoder, a video codec decoder, video post processing modules including, but not limited to, deblocking filter. The pipelined implementation of video codecs and post-processing modules (deblocking filter) in CPU with SIMD extension and DSP/VLIW respectively results in up-to 50 percent reduction of power consumption in the talk time compared to implementation of all these modules in single or multiple DSP/VLIW processor.

Figure 1:
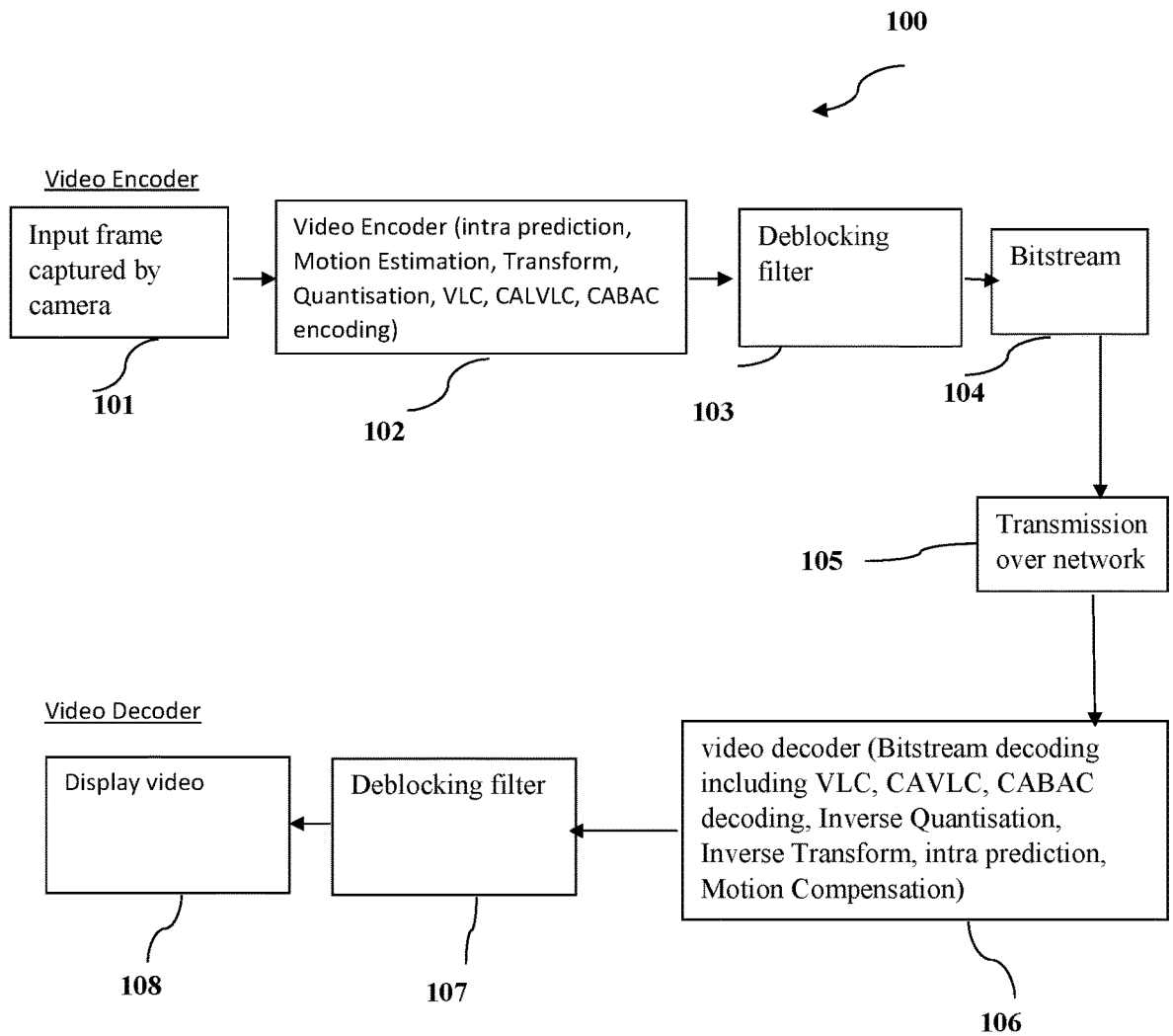
FIG. 1 illustrates a block diagram of a system for optimizing power consumption in video communication in mobile devices, according to one embodiment of the invention.

FIG. 1 illustrates a block diagram of a system for optimizing power consumption in video communication in mobile devices, according to one embodiment of the invention. In a preferred embodiment, the system comprises a camera (101) which is integrated with a mobile device. The camera (101) is configured to receive input video and feeds video frame samples to video encoder module (102). The processed video samples are then passed to deblocking filter (post processing module) (103). The video samples are encoded using the coding tools described in the video codec standard (104).

At the transmitting end, the video frame samples are fed to a video codec encoder module (101). The video codec encoder module is configured to compress/encode the video signal running on a processor, a CPU with SIMD extensions. The various coding tools of the digital video compressed standard specification namely intra prediction, Motion Estimation/inter prediction, transform, quantization, bitstream encoding including VLC, CAVLC, CABAC is implemented on the CPU with SIMD extensions. The processing of video frames is pipelined between the CPU and DSP/VLIW, deblocking filter implemented on DSP/VLIW core. The current consumption in the SoC is reduced up to 50 percent in the transmission path (102, 103, 104) compared to an implementation of the modules on single or multiple DSP/VLIW core. The encoded signals are then transmitted over a transmission network (105).

Further, a video codec decoder module (106) is present at receiving end. The video codec decoder module (106) is configured to decompress/decode the received compressed video signals (running on a CPU with SIMD extension). The decoded video samples are then post processed (deblocking filter). The post processing modules (deblocking filter) (107) is implemented in a DSP/VLIW processor. This pipelined implementation results in reduced current consumption (up to 50 percent) by the mobile device.

Figure 2:
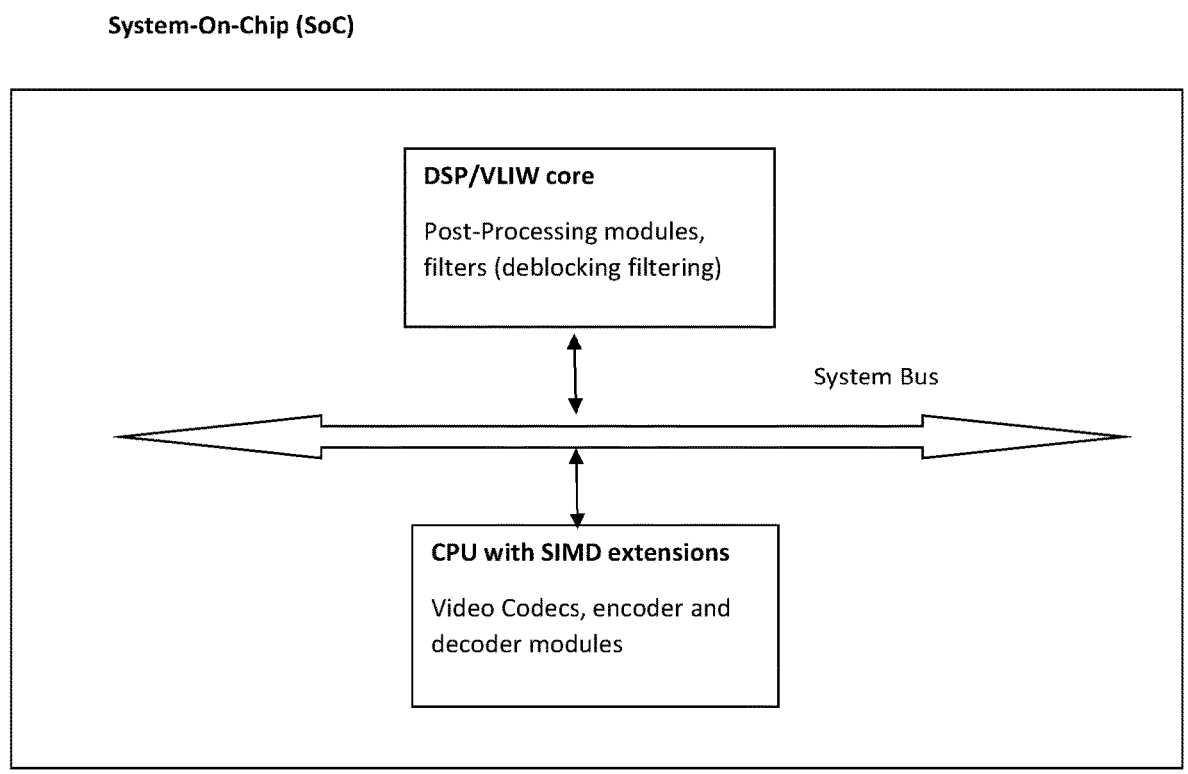
FIG. 2 illustrates method for optimizing power consumption in mobile devices, according to one embodiment of the invention.
Figure 3:
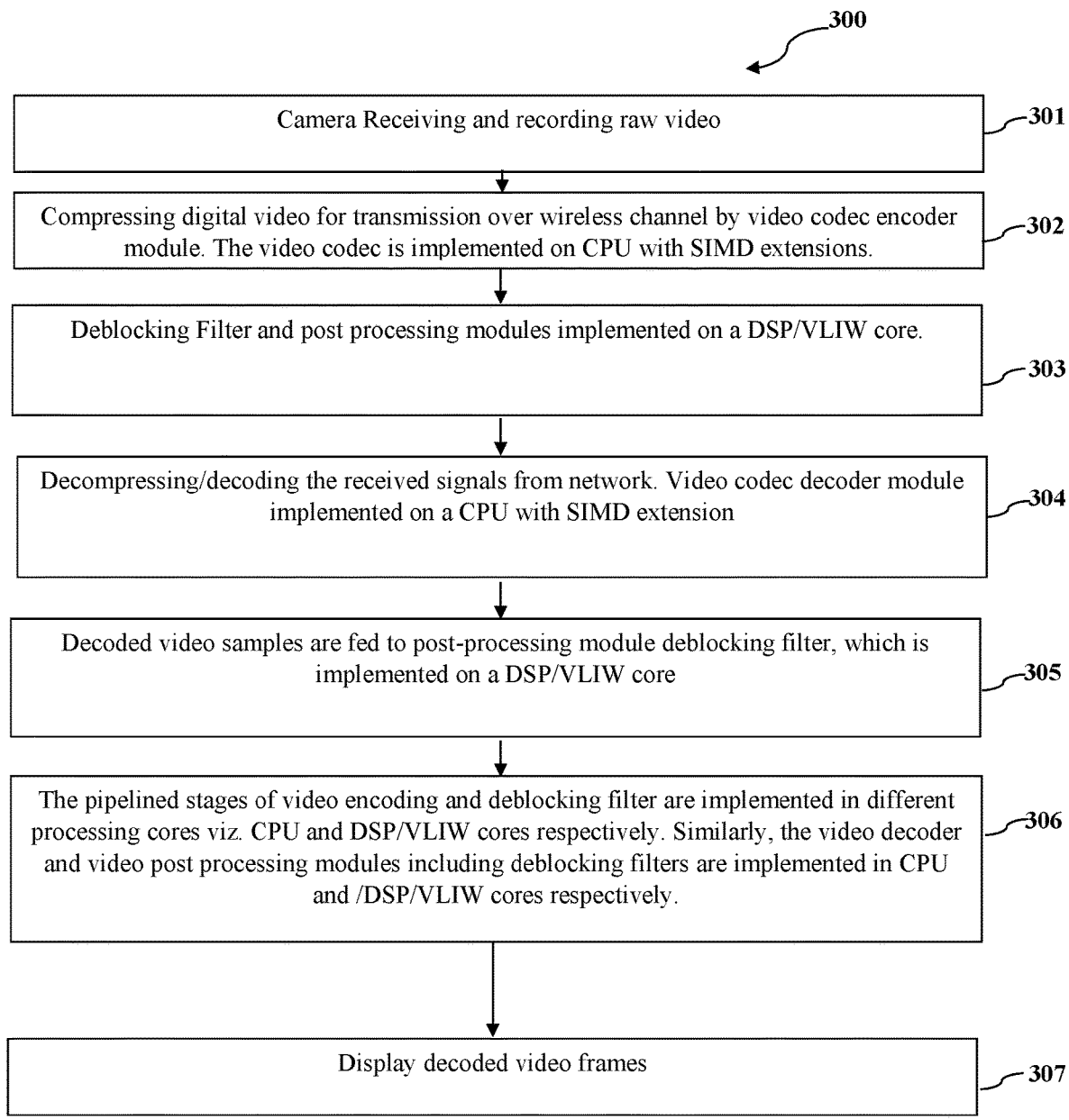
FIG. 3 illustrates method for optimizing power consumption in mobile devices, according to one embodiment of the invention.

FIG. 2 In an embodiment of the invention, the pipelined implementation of video codec and post-processing (deblocking filter) modules on different processing cores CPU and DSP/VLIW core respectively results in reducing current consumption by up to 50 percent (102, 103, 104, and 106, 107). The Architecture of the SoC contains DSP/VLIW and a CPU with SIMD extensions. Thus, low power video communication is achieved using the present invention FIG. 3 illustrates the method for optimizing power consumption in video communication in mobile devices, according to one embodiment of the invention. In a preferred embodiment, the method initiates with the step of receiving and recording raw video at step 301.

At step 302, video frame samples are compressed/encoded by a video codec encoder module. The video encoder is implemented on CPU with SIMD extensions. The deblocking filter and other post processing is implemented on DSP/VLIW core at step 303. The current consumption in video call is reduced by up to 50 percent by this multicore implementation (102, 103, 104). The encoded signals are transmitted via network (105).

At step 304, the compressed video signal is received from the network. Wherein they are decompressed/decoded by the video codec decoder (106).

At step 305, decoded video is deblocking filtered and post-processed to get output video frame (107). The post processed video frame samples are then displayed (108).

The inventive step in video encoder/decoder module implemented on CPU with SIMD extensions is described now. The video frame samples are usually 8 bits. 10 bit video samples are supported nowadays. In intra prediction module, the intra block size could vary from 4×4 to 32×32 depending on the video standard. The reference samples are also 8 bit or 10 bit and are subjected to filtering. The output of this is still 8 or 10 bits, and can fit within 16-bit span of a 32-bit register. The filtering operation is 3 tap filter followed by downscaling, the intermediate results still within 16-bit span. Turning off saturation is thus safe, and the instruction set can have MAC instruction without saturation embedded into it and SIMD optimization is possible. The input to transform module in Intra prediction module is thus 9 or 11 bits. The transform module is implemented so as to ensure intermediate and output results doesn't cross 16-bit span. Thus, again saturation can be turned off and MAC instruction without saturation embedded is useful and SIMD optimization is possible. In inter block coding tool, the input pixel values are 8 or 10 bits. Motion estimation can be performed efficiently and correctly based on Sum of Absolute Difference (SAD) so that it doesn't cross 16-bit span. Input to transform of inter-coded block is 9 bits or 11-bits, and this can also be processed within 16-bit span of intermediate/final results. Thus, saturation can be turned off, enabling Instruction Set Architecture (ISA) to have MAC without saturation embedded in the instruction and SIMD optimization is possible, thus saving Bill of Material (BOM) cost and giving power savings in optimization.

Thus, the present invention provides a method to improve the power consumption in a video communication in mobile device. The talk time is increased by less power consumption, thereby reduction of thermal aspect and extension battery life.

Figure 4A:
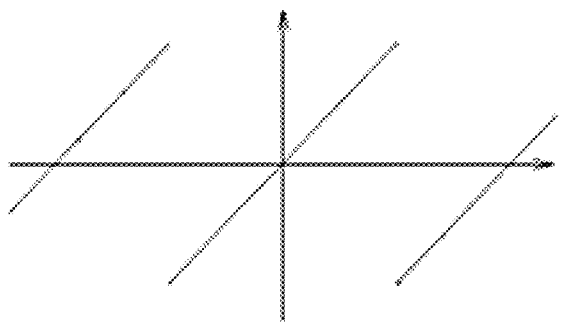
FIG. 4a is a graph showing the normal arithmetic hardware.
Figure 4B:
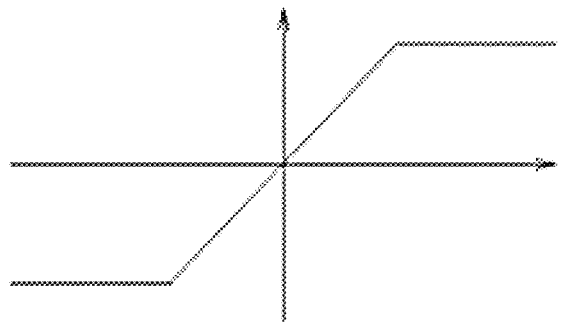
FIG. 4b is a graph showing saturation arithmetic and the difference between saturation and normal arithmetic, where the X-axis is the "real" result and the Y-axis is the out from the hardware.

Normally if the result of an arithmetic operation in a GPP ALU (CPU) is outside the data range the result will "wrap around". Saturation on the other hand means that if the result is larger than what can be represented with the available number of bits, the output will be the highest possible value and if the result is lower than the lowest value that can be represented, the result will be the lowest possible value. FIG. 4a shows normal arithmetic hardware; and FIG. 4b shows saturation arithmetic and the difference between saturation and normal arithmetic, where the X-axis is the "real" result and the Y-axis is the out from the hardware.

Using saturation arithmetic reduces distortion due to overflow in the form of glitches as shown in figure below and may also prevent parasitic oscillations in recursive algorithms. Saturation arithmetic is basically always necessarily supported for the MAC operations in DSP processors.

Figure 5:
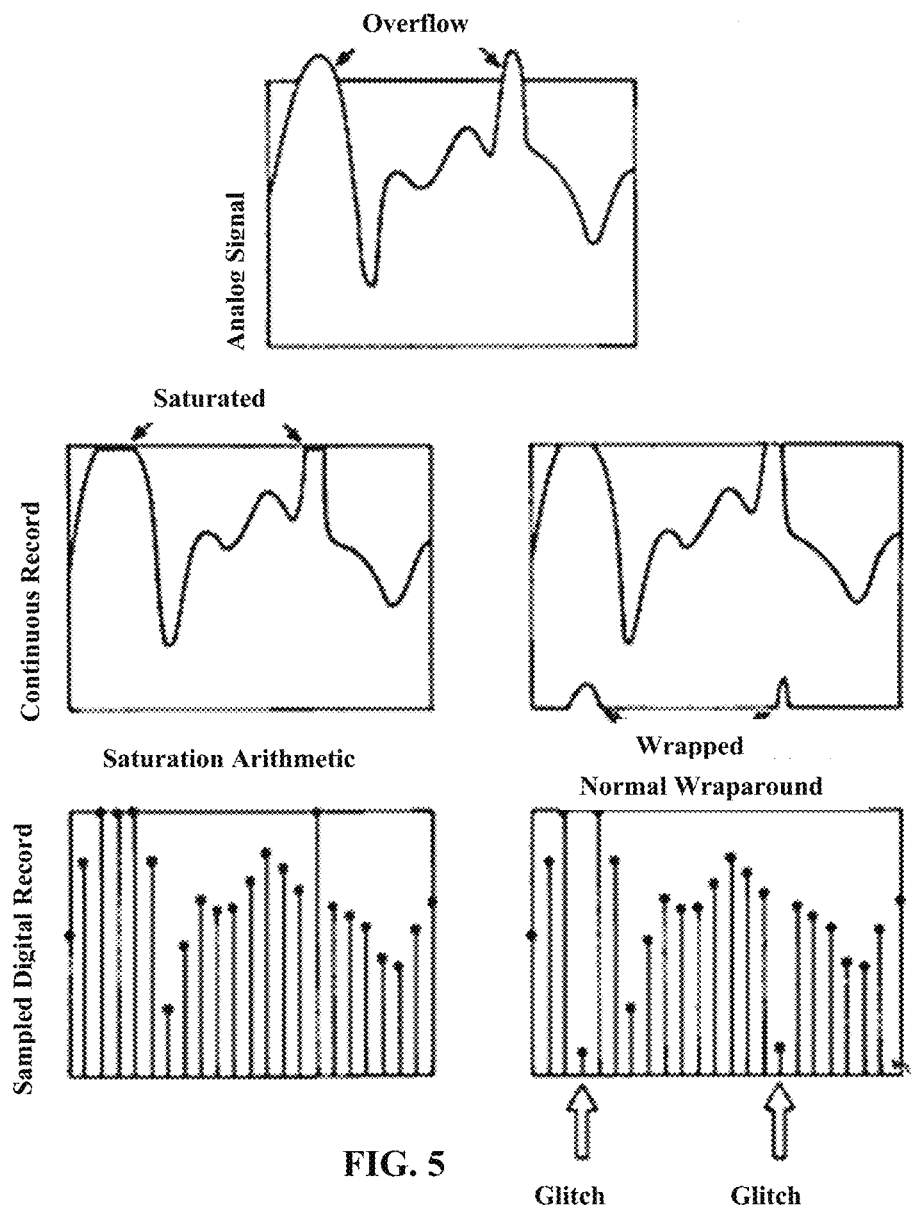
FIG. 5 is a graph showing the consequences of overflow in saturation arithmetic (left) as compared with normal wrap around (right).

The instruction set of DSPs have support for saturation of results. The programmers are therefore not burdened by this aspect. The GPP ALU (CPUs) have SIMD extensions but lack support for saturation of results. It is therefore, the onus of programmer to ensure bit exact results. By inspection of the various video coding tools specification, it is discovered that the operations can be implemented safely without need for saturation support in the instruction. We are able to achieve same performance (compute cycles) as can be achieved with DSP ISA and avoiding overflow issues. FIG. 5 shows the consequences of overflow in saturation arithmetic (left) as compared with normal wrap around (right). The glitch shown in the sampled data, while accurately representing the wraparound values, is erroneous and hard to filter. By contrast, saturation arithmetic has no glitches.

This is the explanation for: "saturation is turned off".

TABLE 1

| Representative code example Filtering Optimization example | |
| --- | --- |
| DSP ALU | CPU ALU |
| ... | ... |
| SMLAD R3, R2, R1, R3 (effectively 1 cycle) | SMULBB R4, R2, R1 (effectively 4 cycles) |
| ... | SMULTT R5, R2, R1 |
| | QADD R3, R3, R4 |
| | QADD R6, R6, R5 |
| | ... |
| | ... |
| | QADD R3, R3, R6 |

Current consumption reduction up to 50 percent

Figure 6:
FIG. 6 is a schematic showing the DSP is actively consuming power for this 2N cycles doing useful work.

In a typical Mobile SoC, the CPU offloads compute intensive video codec implementation/processing onto the DSP on frame basis. Each frame processing takes N cycles for the video codec and N cycles for pre/post processing algorithms such as deblocking filter. The DSP is actively consuming power for this 2N cycles doing useful work, as shown in FIG. 6.

The CPU, on the other hand is busy waiting (blocked) for 2N cycles which is wasted power. The current consumption model of the processing elements is typically proportional to the number of compute cycles. By moving codec implementation from DSP ALU to GPP CPU ALU, we are converting wasted power of CPU into useful work done (50% savings). The DSP is also freed up with the load of codec implementation (system time slice of DSP is reduced), providing the RTOS to do better system performance.

Power consumption:

Power consumed per frame by $DSP = k(2N)^2 T = 4 kN^2 T$

Total power consumed per frame by $CPU$ and $DSP = 8\ kN^2 T$

Power consumption with patented method:

Power consumed by $CPU$ and $DSP$ per frame $= kN^2 (T/2) + kN^2(T/2) = kN^2 T$ k—constant of proportionality; T—Time taken per frame; N—number of cycles to process codec, pre/post processing algorithm.

I claim:

1. A system (100) for optimizing power consumption in video communication in mobile devices, the system (100) comprising:
   a. a camera (101) integrated in the mobile device to receive and record input video frame samples in 8-bit resolution, 10-bit resolution or any resolution;
   b. a video code encoder module (102) configured to compress/encode video signals for efficient transmission over wireless channels, wherein the implementation is performed on a CPU with SIMD extensions, wherein the encoded signals are transmitted via network (105);
   c. Filter modules including, deblocking filter (103), wherein the filter module (103) receives previously processed video frame samples from the encoder (101), wherein the filtering module (103) is implemented in a DSP/VLIW processor;
   d. a video codec decoder module (106) configured to decompress/decode the received compressed video signal from network (105), wherein the video codec decoder is implemented on a CPU with SIMD extensions, wherein the video codec decoder module (106) is present at receiving end;
   e. filtering modules including deblocking filter (107), wherein the decoded video frame samples are filtered on a DSP/VLIW core;
   f. saturation is turned off in the video codec encoder/decoder modules; wherein the encoder/decoder modules are implemented on a CPU with SIMD extensions;
   g. the SoC is designed to have CPU with SIMD extensions and DSP/VLIW processing core to have pipelined implementation of the video communication modules between the two cores; where in the Arithmetic Logic Unit (ALU) of CPU is designed without saturation in the critical instructions, wherein the critical instructions include Multiply and Accumulate (MAC) and shift instructions, and
   h. a video receiver (108) configured to receive video frame samples from filtering module (107).

2. The system as claimed in claim 1, wherein the video codec module (102, 106) includes MPEG-1, MPEG-2, MPEG-4, H.264, H.265, AV1, VP8, VP10 standard video codes.

3. The system as claimed in claim 1, wherein the mobile device includes portable cell phone, mobile handset, mobile phone, wireless phone, cellular phone, portable phone, a personal digital assistant (PDA), and smartphones.

4. The system as claimed in claim 1, wherein the optimizing power consumption is applicable in video playback and video record with no transmission.

5. The system as claimed in claim 1, wherein the current consumption is reduced by up to 50 percent in video communication compared to implementation of all the modules (video codec encoder, video codec decoder, filtering (Deblocking filter) and Post-processing) on a single or multiple DSP/VLIW processor in the SoC.

6. A method for optimizing power consumption in mobile devices, the method comprising the steps of:
   a. a camera (101) integrated in the mobile device to receive and record input video frame samples in 8-bit resolution, 10-bit resolution or any resolution;
   b. a video code encoder module (102) configured to compress/encode video signals for efficient transmission over wireless channels, wherein the implementation is performed on a CPU with SIMD extensions, wherein the encoded signals are transmitted via network (105);
   c. Filter modules including, but not limited to, deblocking filter (103), wherein the filter module (103) receives previously processed video frame samples from the encoder (101), wherein the filtering module (103) is implemented in a DSP/VLIW processor;
   d. a video codec decoder module (106) configured to decompress/decode the received compressed video signal from network (105), wherein the video codec decoder is implemented on a CPU with SIMD extensions, wherein the video codec decoder module (106) is present at receiving end;
   e. filtering modules including, but not limited to deblocking filter (107), wherein the decoded video frame samples are filtered on a DSP/VLIW core;
   f. saturation is turned off in the video codec encoder/decoder modules; wherein the encoder/decoder modules are implemented on a CPU with SIMD extensions;
   g. the SoC is designed to have CPU with SIMD extensions and DSP/VLIW processing core to have pipelined implementation of the video communication modules between the two cores; where in the Arithmetic Logic Unit (ALU) of CPU is designed without saturation in the critical instructions, wherein the critical instruction include but not limited to Multiply and Accumulate (MAC) and shift instructions; and
   h. a video receiver (108) configured to receive video frame samples from filtering module (107).

7. The method as claimed in claim 6, wherein the video codec modules (102, 106) includes, but not limited to, MPEG-1, MPEG-2, MPEG-4, H.264, H.265, AV1, VP8, VP10 standard video codecs.

8. The method as claimed in claim 6, wherein the mobile device includes portable cell phone, mobile handset, mobile phone, wireless phone, cellular phone, portable phone, a personal digital assistant (PDA) and smartphones.

9. A system (100) for optimizing power consumption in video communication in mobile devices, the system (100) comprising:
   a. a camera (101) integrated in the mobile device to receive and record input video frame samples in 8-bit resolution, 10-bit resolution or any resolution, wherein the mobile device includes portable cell phone, mobile handset, mobile phone, wireless phone, cellular phone, portable phone, a personal digital assistant (PDA), and smartphones;
   b. a video code encoder module (102) configured to compress/encode video signals for efficient transmission over wireless channels, wherein the implementation is performed on a CPU with SIMD extensions, wherein the encoded signals are transmitted via network (105), video codec module (102, 106) includes MPEG-1, MPEG-2, MPEG-4, H.264, H.265, AV1, VP8, VP10 standard video codecs;
   c. Filter modules including deblocking filter (103), wherein the filter module (103) receives previously processed video frame samples from the encoder (101), wherein the filtering module (103) is implemented in a DSP/VLIW processor;
   d. a video codec decoder module (106) configured to decompress/decode the received compressed video signal from network (105), wherein the video codec decoder is implemented on a CPU with SIMD extensions, wherein the video codec decoder module (106) is present at receiving end;
   e. filtering modules including deblocking filter (107), wherein the decoded video frame samples are filtered on a DSP/VLIW core;
   f. saturation is turned off in the video codec encoder/decoder modules; wherein the encoder/decoder modules are implemented on a CPU with SIMD extensions;
   g. the SoC is designed to have CPU with SIMD extensions and DSP/VLIW processing core to have pipelined implementation of the video communication modules between the two cores; where in the Arithmetic Logic Unit (ALU) of CPU is designed without saturation in the critical instructions, wherein the critical instructions include Multiply and Accumulate (MAC) and shift instructions, and
   h. a video receiver (108) configured to receive video frame samples from filtering module (107), wherein the optimizing power consumption is applicable in video playback and video record with no transmission, and the current consumption is reduced by up to 50 percent in video communication compared to implementation of all the modules (video codec encoder, video codec decoder, filtering (Deblocking filter) and Post-processing) on a single or multiple DSP/VLIW processor in the SoC.

* * * * *